United States Patent
Goyal et al.

(10) Patent No.: US 10,733,187 B2
(45) Date of Patent: *Aug. 4, 2020

(54) TRANSFORMING A SCALAR SUBQUERY

(71) Applicant: INTERNATIONAL BUSINESS MACHINES CORPORATION, Armonk, NY (US)

(72) Inventors: Abhinav Goyal, Markham (CA); Robert P. Neugebauer, Stouffville (CA); Afiya Nusrat, Markham (CA); Nattavut Sutyanyong, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/892,816

(22) Filed: Feb. 9, 2018

(65) Prior Publication Data
US 2019/0251196 A1 Aug. 15, 2019

(51) Int. Cl.
*G06F 16/2453* (2019.01)
*G06F 16/2455* (2019.01)

(52) U.S. Cl.
CPC .. *G06F 16/24544* (2019.01); *G06F 16/24535* (2019.01); *G06F 16/24537* (2019.01); *G06F 16/2456* (2019.01); *G06F 16/24534* (2019.01)

(58) Field of Classification Search
CPC .......... G06F 16/24535; G06F 16/2456; G06F 16/24544; G06F 16/24526;
(Continued)

(56) References Cited

U.S. PATENT DOCUMENTS 5,557,791 A * 9/1996 Cheng ................. G06F 16/2456
5,615,361 A * 3/1997 Leung ............... G06F 16/24537
707/714
(Continued)

OTHER PUBLICATIONS

IBM: List of IBM Patents or Patent Applications Treated as Related (Appendix P), Jul. 17, 2019, pp. 1-2.
(Continued)

*Primary Examiner* — Dennis Truong
(74) *Attorney, Agent, or Firm* — Samuel A. Waldbaum (57) ABSTRACT

A method, computer system, and a computer program product for transforming a scalar sub-query to join with non-provable singleton output, responsive to receiving a parsed representation of a statement, containing a scalar operation, which is correlated to predetermined types of objects, by analyzing the parsed representation to determine eligibility for transformation of any scalar operations. Responsive to a determination of eligibility, a query engine injects additional processing into the parsed representation to defer checking of a 1 row condition required by statement semantics. The query engine further injects processing to utilize a result of the additional processing to validate a single row is produced for each GROUPING/PARTITION key. The parsed representation is modified to remove the 1 row condition. The query engine decorrelates the parsed representation using a predetermined method absent a requirement for a unique key to be present in a predicate of the scalar operation.

12 Claims, 6 Drawing Sheets

(58) Field of Classification Search
CPC ......... G06F 16/24534; G06F 16/24537; G06F 16/2445; G06F 16/24542; G06F 16/90335; Y10S 707/99933; Y10S 707/99934
USPC ........... 707/999.004, 714, 999.003, 718, 713
See application file for complete search history.

(56) References Cited

U.S. PATENT DOCUMENTS

| | | | | |
|---|---|---|---|---|
| 5,724,570 | A * | 3/1998 | Zeller | G06F 16/24535 |
| 5,822,750 | A | 10/1998 | Jou et al. | |
| 5,956,706 | A * | 9/1999 | Carey | G06F 16/2438 |
| 6,339,768 | B1 * | 1/2002 | Leung | G06F 16/24535 |
| 6,449,605 | B1 * | 9/2002 | Witkowski | G06F 16/24537 |
| 6,826,562 | B1 * | 11/2004 | Leung | G06F 16/24535 707/713 |
| 7,020,661 | B1 * | 3/2006 | Cruanes | G06F 16/2456 |
| 7,051,034 | B1 * | 5/2006 | Ghosh | G06F 16/90335 707/718 |
| 7,167,853 | B2 | 1/2007 | Zaharioudakis et al. | |
| 7,587,383 | B2 | 9/2009 | Koo et al. | |
| 8,521,723 | B1 * | 8/2013 | Ahmed | G06F 16/24534 707/714 |
| 2007/0038618 | A1 * | 2/2007 | Kosciusko | G06F 16/24534 |
| 2011/0213756 | A1 * | 9/2011 | Chen | G06F 16/254 707/684 |
| 2014/0101130 | A1 * | 4/2014 | Kang | G06F 16/24544 707/714 |
| 2014/0280036 | A1 | 9/2014 | Korlapati et al. | |
| 2015/0142775 | A1 * | 5/2015 | Kang | G06F 16/24544 707/714 |
| 2015/0286683 | A1 * | 10/2015 | Zhou | G06F 16/2456 707/693 |
| 2018/0081946 | A1 * | 3/2018 | Bondalapati | G06F 16/24544 |

OTHER PUBLICATIONS

Pending U.S. Appl. No. 16/512,859, filed Jul. 16, 2019, entitled: Transforming a Scalar Subquery, 36 pages.
Bellamkonda et al., "Enhanced Subquery Optimizations in Oracle," Proceedings of the VLDB Endowment (VLDB 09), Aug. 24-28, 2009, p. 1366-1377, ACM, Lyon, France.
Wikibooks, "Structured Query Language/SQLSTATE," Wikibooks: Open books for an open world, Last Modified on Jan. 24, 2018, p. 1, https://en.wikibooks.org/wiki/Structured_Query_Language/SQLSTATE, Accessed on Jan. 26, 2018.

* cited by examiner

TRANSFORMING A SCALAR SUBQUERY

BACKGROUND

The present invention relates generally to decorrelation techniques used in a relational database management system, and more specifically, to extending a decorrelation technique for a scalar subquery to a join in a relational database management system.

Database management systems (DBMSs) are used to organize and manage large amounts of information. The data stored in databases is normally structured into records with predetermined fields. These fields identify the information in the records, and are normally organized into tables having rows and columns such that a query may be executed by a DBMS and the DBMS may generate a query response having query-satisfying information retrieved from the row(s) and column(s) associated with the tables.

A DBMS is an executable program stored on a data processing system. As is known to those skilled in the art, such a data processing system may include different hardware and software combinations. Users may access tabled information stored within a database which is operatively coupled to the DBMS by way of a user interface using, for example, a structured query language (SQL) or an XQuery and the like.

A given query or statement may be parsed and compiled by a compiler contained within the DBMS, and as a result of compiling the given query the DBMS generates executable code, which may be used for retrieving query-satisfying data, which may satisfy the requirements of the given query or statement. Typically, the DBMS may include a user command processor for processing user commands, such as queries, and executing such user commands against the database. Data processing system usable medium may contain executable code for directing the DBMS to perform algorithms related to operations of the DBMS. The data processing system usable medium may also store the database.

One way to manipulate and access a data collection stored within the database is to use a query, such as an SQL query. SQL queries may be of varying structure and complexity. Many such queries however, are often structured to utilize query predicates, which cannot be evaluated until execution of the SQL query at runtime. A query predicate is generally known as an element of a search value that expresses or implies a comparison operation. In effect, a predicate specifies a condition about a row of data or group of data to be manipulated by an SQL query.

In relational database systems, decorrelation techniques have become commonplace, and are in wide use in the industry. These techniques allow for removal of dependencies in processing order and open up a wider set of access plan and optimization choices. In columnar database systems, such techniques have become even more important due to lack of indexes and requirements faster data access.

A correlated subquery is a subquery for which processing depends on the data values from other parts of an SQL statement outside a scope of the subquery, referred to as an outer query block. The subquery is evaluated for each row of the outer query block.

Decorrelation is a process used to remove a dependency on the outer query, which allows for a large set of data to be read and processed and typically leads to substantially higher performance than without the application of decorrelation.

A scalar subquery is a subquery that is guaranteed to produce a single data value. Subqueries and/or scalar subqueries may be present in either a predicate context or an output expression context. When a result of more than one value is generated then an SQL error must be produced.

A typical approach to optimization of correlated SQL queries in a relational database management system implements decorrelation to achieve faster query processing. However, a requirement of the implementations uses an extra set of joins, which as a result, have performance and optimization limitations because the data typically needs to be read twice or preserved in a temp table.

In another typical approach, involving the transforming of correlated scalar subqueries there is a requirement for the presence of a uniqueness constraint, for example, a primary key, or a unique key, to be able to prove in advance that the output of the subquery will be a singleton. This requirement is a constraint that imposes significant limitations for the applicability of prior work to a relatively small set of SQL queries.

There is a need to overcome the drawbacks of the aforementioned optimization techniques.

SUMMARY

According to an embodiment of the present disclosure, a method, computer system and computer program product for transforming a scalar sub-query to join with non-provable singleton output, in response to receiving a parsed representation of a statement or data modifying statement containing a scalar operation, which is correlated to predetermined types of objects, analyzes the parsed representation to determine eligibility for transformation on any scalar operations present in the parsed representation. In response to a determination of eligibility for transformation, a query engine injects additional processing into the parsed representation of the statement to defer checking of a 1 row condition required by statement semantics. The query engine injects further processing to utilize a result of the additional processing to validate that a single row is produced for each set of columns which corresponded to the columns used in the original correlated scalar subquery execution. The parsed representation of the statement is modified to remove the 1 row condition required by the statement semantics. The query engine further decorrelates the parsed representation of the statement using a selected predetermined method absent a requirement for a unique key to be present in a predicate of the scalar operation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
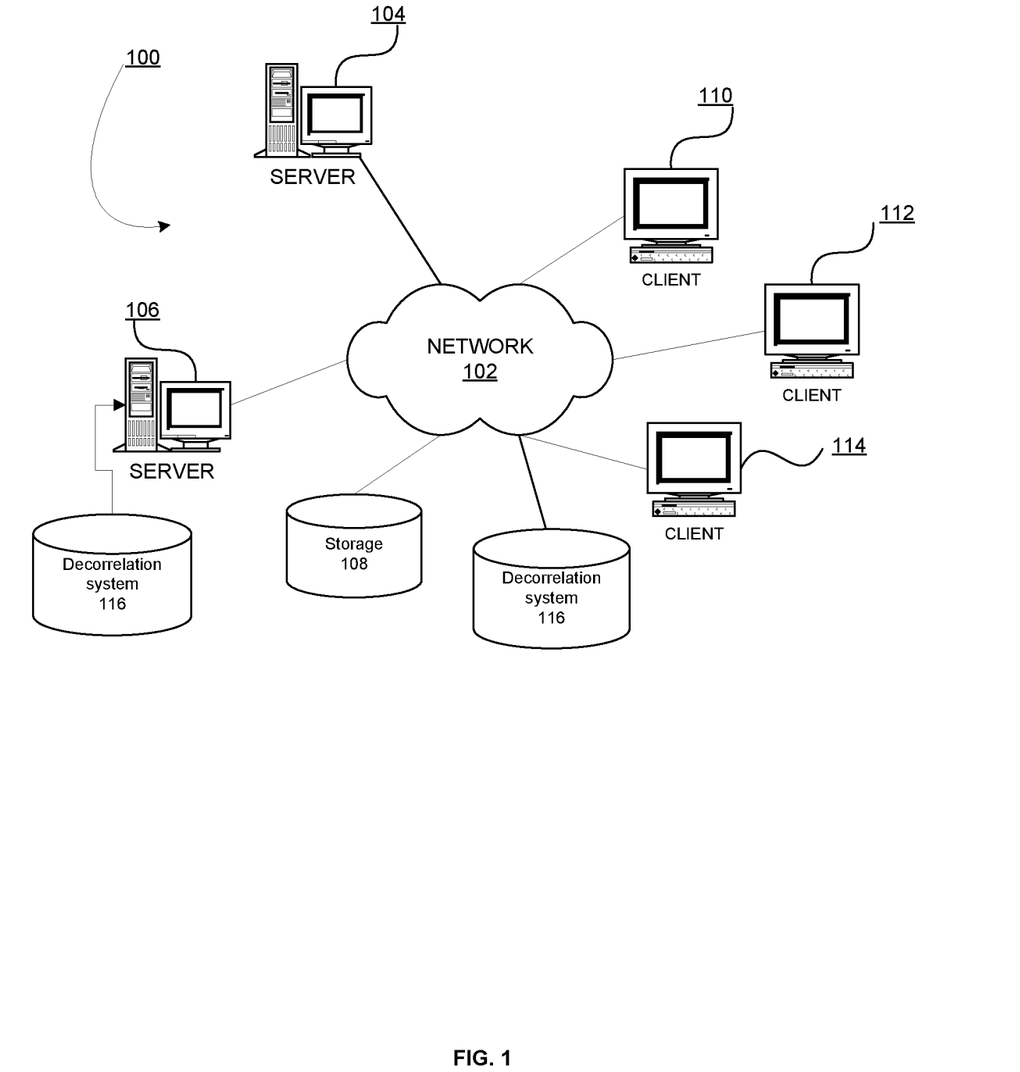
FIG. 1 is a block diagram of a network data processing system operable for various embodiments of the disclosure.
Figure 2:
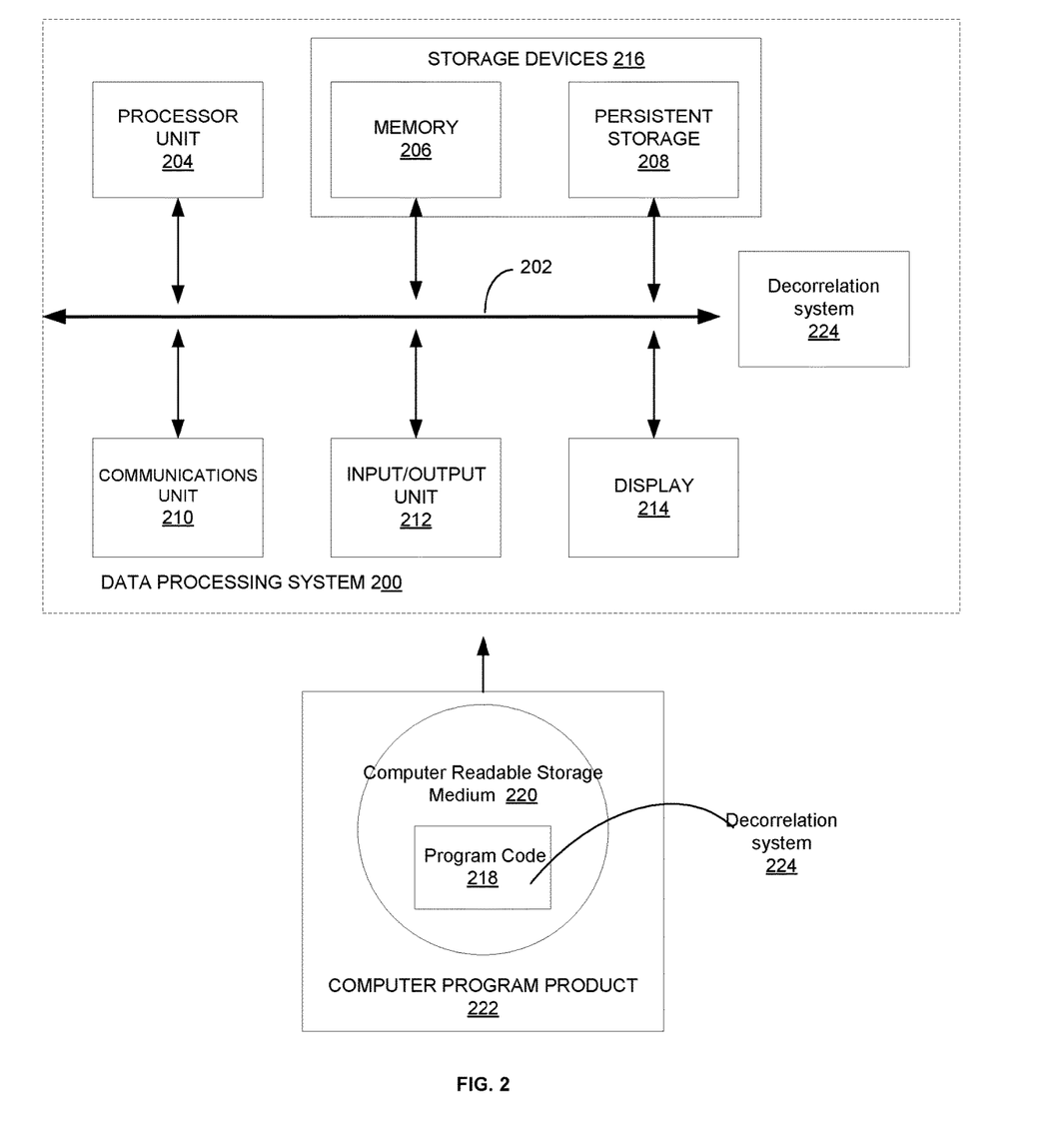
FIG. 2 is a block diagram of a data processing system in the network data processing system of FIG. 1 operable for various embodiments of the disclosure.

With reference now to the FIGS. and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, decorrelation system 116 and applications to clients 110, 112, and 114. Clients 110, 112, and 114 are clients to server 104 in this example. In addition, decorrelation system 116 may also be directly connected to network 102. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, display 214 and decorrelation system 224.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In another example, decorrelation system 224 may also be contained within memory 206 or persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable. In one example, program code 218 contains program code which when executed causes decorrelation system 224 to be fully functional.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

The description, which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following detailed description of the embodiments of the present invention does not limit the implementation of the present invention to any particular data processing system programming language. The present invention may be implemented in any data processing system programming language provided that the OS (Operating System) provides the facilities that may support the requirements of the embodiments of the present invention. Any limitations presented may be quite likely a result of a particular type of OS, data processing system programming language, or data processing system and may not be a limitation of the embodiment of the present invention.

Figure 3:
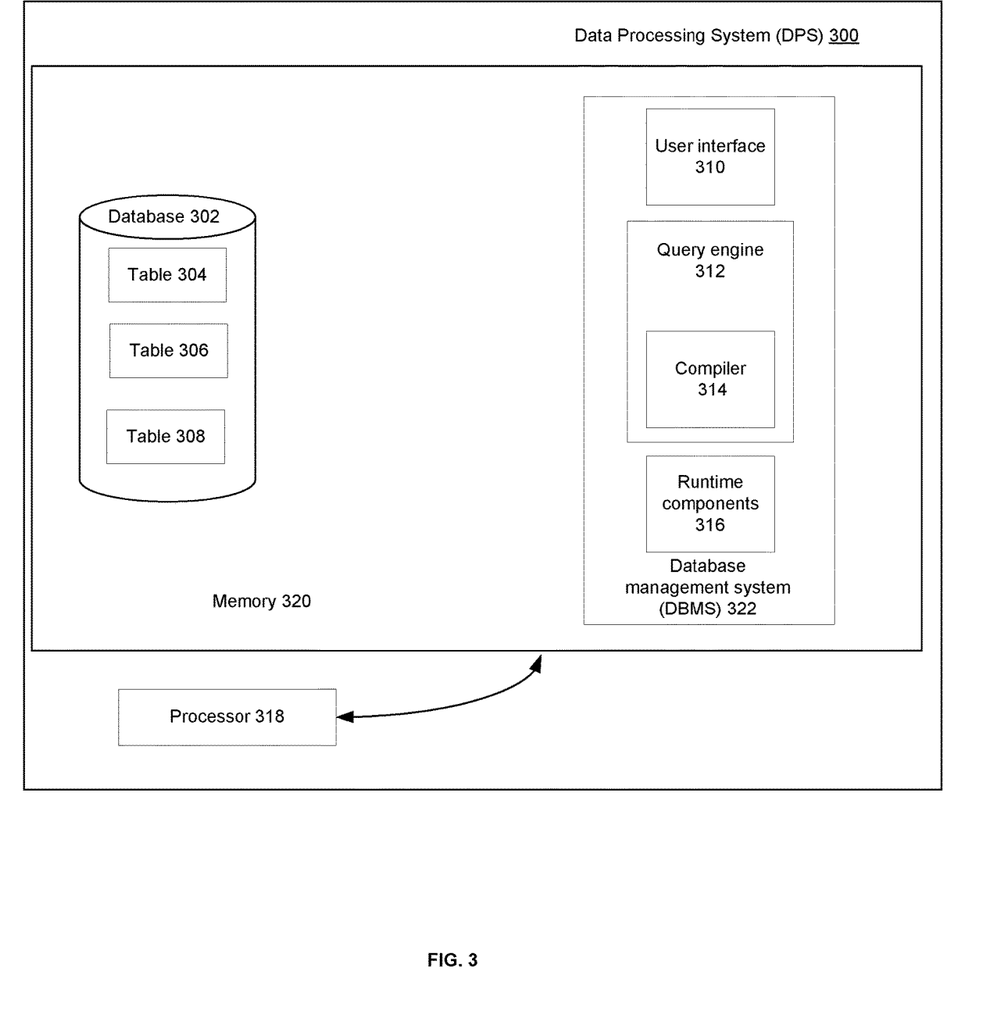
FIG. 3 is a block diagram representation of a database management system operable for various embodiments of the disclosure.

FIG. 3 is a block diagram of components of data processing system 300 in an example of an embodiment of the disclosure. DBMS 322 is implemented as data processing system executable code stored in a computer readable memory, which is operatively coupled to data processing system (DPS) 300. DPS 300 is an example of a data processing system included in network data processing system 100 of FIG. 1 or data processing system 200 of FIG. 2. Operatively coupled to the DBMS 322 is database 302, which is also stored in memory 320, associated with DPS 300. DPS 300 also includes processor 318, which is operatively coupled to memory 320. Processor 318 executes the data processing system executable code associated with DBMS 322 and thereby achieves desired operational performance of the DBMS 322.

DBMS 322 includes a user interface 310, which provides an access point for a user of the DBMS 322 by which the user may enter database statements (for example, SQL or XQuery queries) against information stored in database 302. In general, the term "query" refers to a read only operation whereas "statement" or "operation" applies to either a read operation or a write operation. Data modifying statements refer to statements that "write" as in use of update, insert and delete operations. User interface 310 may further provide an interface for providing information requested in the query to a user of the DBMS 322.

DBMS 322 also includes a query engine 312 and runtime components 316. Query engine 312 processes commands received through user interface 310, typically in the form of SQL or XQuery statements. Query engine 312 also includes compiler 314. Compiler 314 translates query or data modifying statements from the user interface 310 into data processing system usable code so that DPS 300 in which the DBMS 322 is implemented may act or operate upon the statements. DPS 300 usable instructions or code may be generated as runtime components 316 which are issued against database 302.

Processor 318 may be used, among other things, for processing runtime components 316 and other functions of the DBMS 322. Query engine 312 may also be responsible for optimizing the statements and generating an access plan for each such statement, which access database 302.

An information collection stored within database 302 may be organized into tables such as table 304, table 306, and table 308, so that the information may be organized in a logical manner, or to simply divide large amounts of data into smaller data objects. Rows and columns further organize information fields in tables 304, 306 and 308. In general, data in database 302 may be organized into data structures including rows that are indexable along one or more columns. Depending on an organization of a collection of data within database 302, it is possible for data to be duplicated within fields of different tables, such as tables 304, 306 or 308.

When an SQL (or a XQuery) statement is issued against DBMS 322, query engine 312 provides an optimization function whereby SQL statements are optimized for execution in DBMS 322 based on information known to query engine 312. However, many SQL statements are structured with predicates that utilize data variables with values that are not known until execution of the statement at runtime.

Memory 320, which is computer readable memory, may include hardware, software or a combination thereof such as, for example, magnetic disks, magnetic tape, optically readable medium, semi-conductor memory, or random access memory (RAM) and the like without restriction. Furthermore, DBMS 322 may be organized in a standalone model whereby DBMS 322 may be operated by a single data processing system, or may be operated in a distributed manner over a plurality of network-coupled data processing systems. Also, DBMS 322 may be operated under a client-server model whereby one or more data processing systems that act as servers which store the database, and one or more data processing systems that act as clients which operates DBMS 322. DBMS 322 may be operated in any combination of the above-mentioned configurations.

Using DBMS 322 implemented as data processing system executable code stored in computer readable memory operatively coupled to DPS 300 of FIG. 3 as an example, a computer-implemented process for transforming a scalar sub-query to join with non-provable singleton output, is presented. DBMS 322, in response to receiving a parsed representation of a query or data modifying statement containing a scalar operation, which is correlated to predetermined types of objects, analyzes the parsed representation to determine eligibility for transformation on any scalar operations present in the parsed representation. In response to a determination of eligibility for transformation, injecting, by query engine 312, additional processing into the parsed representation of the query to defer checking of a 1 row condition required by query semantics. Query engine 312 injects further processing to utilize a result of the additional processing to validate that a single row is produced for each set of columns which corresponded to the columns used in the original correlated scalar subquery execution.

For example, in an exemplary embodiment as described, the query engine injects a window function in conjunction with the window-name-or-specification at a location after the created LEFT JOIN operation, which replaced the scalar operation. The query engine further adds all referenced columns from any tables or relations present in a parent operation to the window-specification of the window-function. The query engine further adds the column or columns representing the unique identifier for each row of the parent operation to the window-specification of the window-function. The unique identifier is generated for each row when the unique identifier does not already exist for the tables and relations present in the parent operation. The query engine further utilizes a COUNT column-function as the window-function described above and referencing the correlated column. In an alternate embodiment, a numbering-function such as ROW_NUMBER may be used instead of the COUNT column-function described above. In a further alternate embodiment, a GROUP BY operation with a grouping key similar to the window-specification described may replace the window-function.

For more information on the window-function and window-name-or-specification, please refer to ISO/IEC 9075-2:2003 (E), Information technology—Database languages—SQL—Part 2: Foundation (SQL/Foundation), page 218, Section 6.10 <window-function> or subsequent revision of the specification.

DBMS 322 further modifies the parsed representation of the query to remove the 1 row condition required by the query semantics. Query engine 312 further decorrelates the parsed representation of the query using a selected existing method absent a requirement for a unique key to be present in a predicate of the scalar operation.

Figure 4:
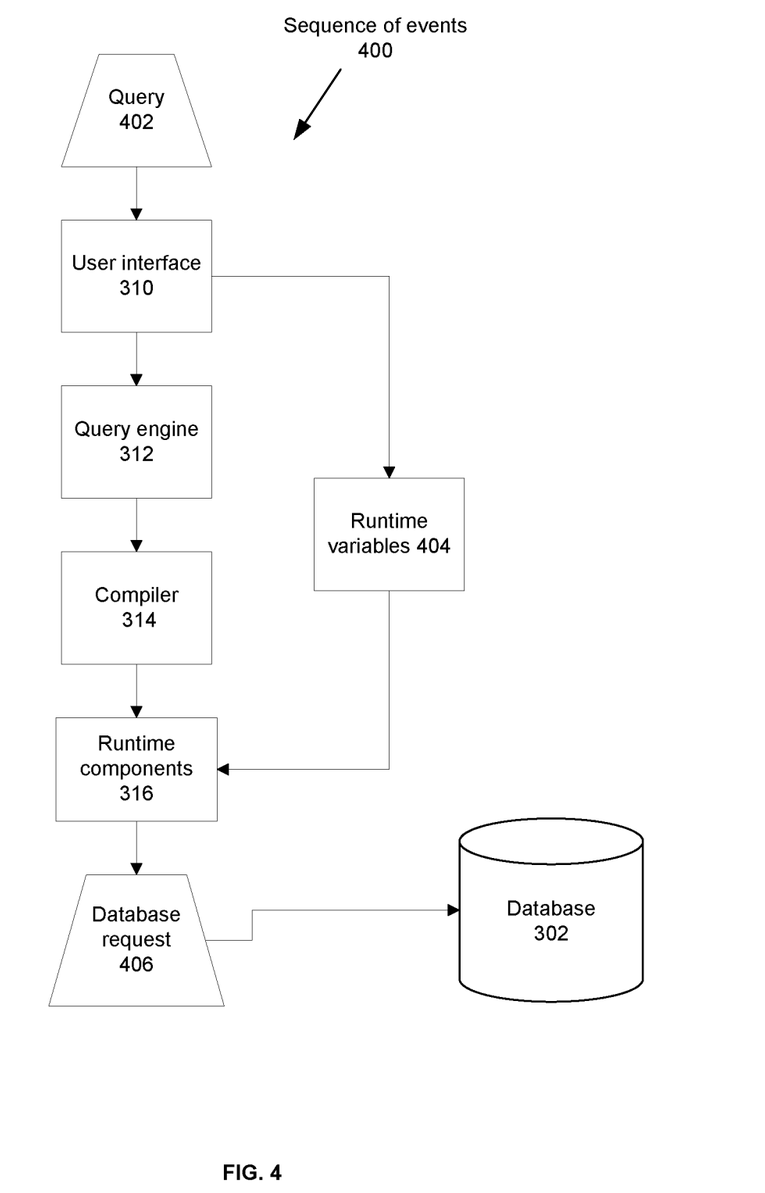
FIG. 4 is a flowchart of a sequence of events using the database management system of FIG. 3 in accordance with one embodiment of the disclosure.

FIG. 4 is a flowchart of a sequence of events 400 following an issuance of a query 402 on the DBMS 322 of FIG. 3. In response to query 402 being received using user interface 310, query 402 is passed to query engine 312 for query optimization. The optimized query (not depicted) provides or generates an access plan (not depicted) that is compiled by compiler 314 to generate runtime components 316. Runtime components 316 are readable by processor 318. As query 402 executes, for example, at runtime, any data values for data variables and predicates required by query 402, for example, the value of a host variable, are retrieved by processor 318 from runtime variables 404 and incorporated into runtime components 316 by processor 318 to generate database request 406. Database request 406 accesses the contents of database 302 and executes query 402 against the contents or information stored within database 302.

In a data processing system capable of processing queries or other operations against data, for example a relational database for processing Structured Query Language (SQL) queries including DBMS 322 of FIG. 3, components of data processing system, DPS 300 also of FIG. 3, are responsible for processing data according to the semantic rules of the query language used. For example, a semantic condition relevant to the field of an embodiment of the disclosure is a requirement for scalar operations to return exactly one row to the containing operation regardless of whether the body of the scalar operation produces 0, 1 or greater then 1 row. The SQL standard specifies that a body producing greater then 1 row is an error condition with SQLSTATE 21000 and that a body producing 0 rows will force the generation of a tuple containing NULL values for each output column in the relation. (For more information on the error condition, please refer to ISO/IEC 9075-2:2003 (E), Information technology—Database languages—SQL—Part 2: Foundation (SQL/Foundation), page 369, Section 7.15 <subquery> which states "3) Let SS be a <scalar subquery>. ☐Case: a) If the cardinality of SS is greater than 1 (one), then an exception condition is raised: cardinality violation. ☐b) If the cardinality of SS is 0 (zero), then the value of the <scalar subquery> is the null value. ☐c) Otherwise, let C be the column of <query expression> simply contained in SS. The value of SS is the value of C in the unique row of the result of the <scalar subquery>.").

A common practice in the field uses columns from outer tables or outer query blocks within a scalar operation either as filtering predicates to limit the data produced and/or within expressions to adjust processing of the data within the scalar operation. This technique of reference is referred to as a correlated reference.

Correlated references dictate a row at a time evaluation for the containing operation and the body of the scalar operation will be re-executed for each outer tuple and/or each unique combination of the correlated references within the scalar operation. As a result, this method of evaluation typically results in a query that performs poorly because of the multiple instance of re-execution. Therefore, this form of data processing typically employs steps to decorrelate the queries when possible.

In the case of scalar operations, the required semantics make decorrelating of the scalar operations difficult. As a result, these scalar operations typically result in poor query performance. As previously used, decorrelation of correlated scalar operations is possible when the correlated column is used in a context of an equality predicate. Furthermore, the non-correlated operand of the predicate represents a unique key of a respective table or relation.

An embodiment of the disclosure describes a method of decorrelating a general form of a scalar operation, which does not meet the unique requirement described above. These scalar operations are typically present in SQL queries, SQL data modifying operations including INSERT, UPDATE, DELETE, and MERGE and in procedural evaluations. The embodiments are also applicable to query languages other than SQL, including XQuery and other languages, which also have a concept of scalar operations and correlated references.

Figure 5:
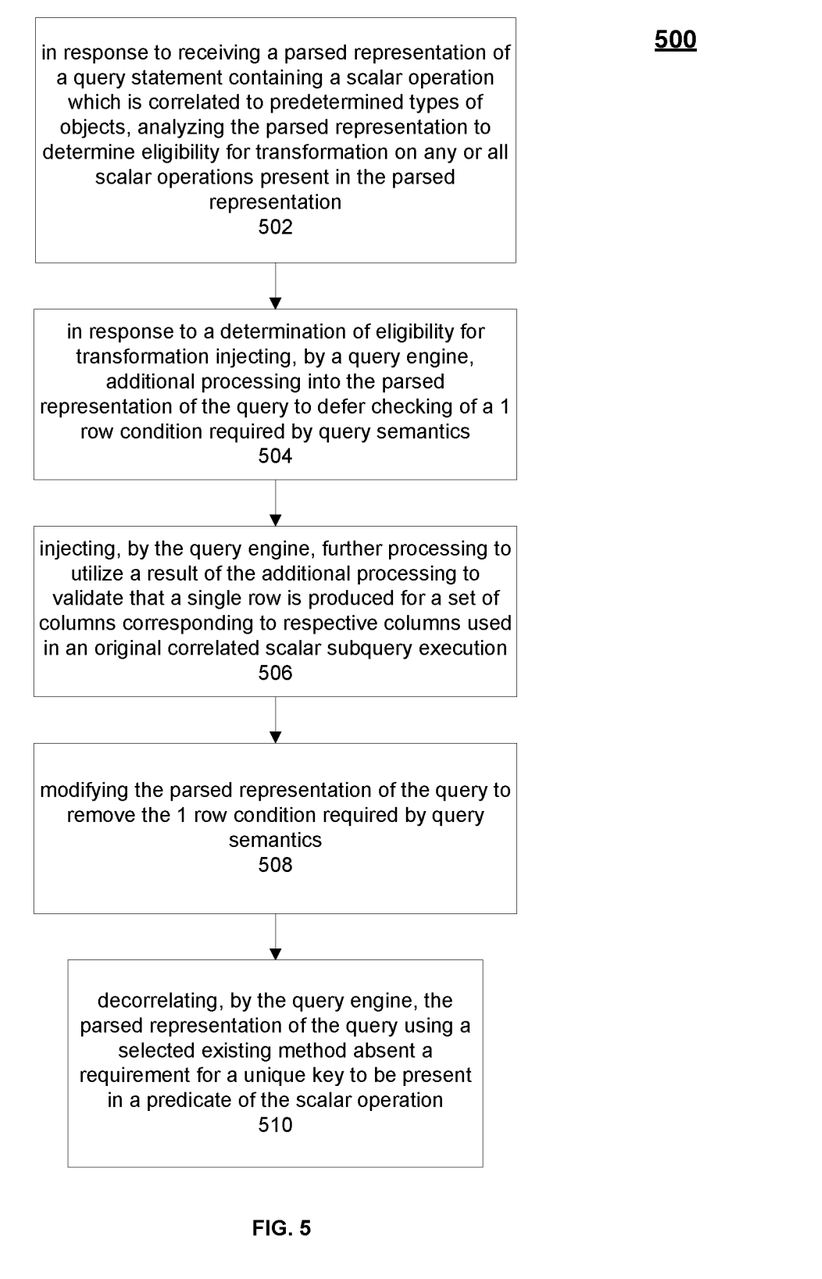
FIG. 5 is a flowchart of a process using the database management system of FIG. 3 in accordance with one embodiment of the disclosure.

FIG. 5 is a flowchart of an overview of a process of decorrelation operable for various embodiments of the disclosure. Implementation details for an embodiment of the disclosure make use of existing techniques in relational database systems including methods of addition of a virtual column, addition of aggregation, join techniques and post-pass filtering.

Process 500 is an example of an embodiment of the disclosure, which presumes a parsed representation of a query or statement containing a scalar operation, which is correlated to outer tables or query blocks. This parsed representation includes annotation regarding semantic requirements of the scalar operation.

In response to receiving a parsed representation of a query or data modifying statement containing a scalar operation, which is correlated to predetermined types of objects, the parsed representation is analyzed to determine eligibility for transformation on any or all of the scalar operations present in the parsed representation, step 502. The query engine analyzes input containing the parsed representation to determine the eligibility of using a technique of decorrelation on the scalar operations that may be present in the query. This determination of eligibility includes a determination whether one or more conditions are satisfied, comprising column lengths, data types, uniqueness, presence of indexes, non-determinism, operations with side effects, additional semantic requirements which may conflict with or be compatible with an implementation of an embodiment, an ability to sort or otherwise compare data, a sampling of the data, involvement in a recursion, and usage of the correlated reference in the scalar operation.

In an exemplary embodiment, the checking requires all columns coming from an outer relation are of a type and length that can be sorted and compared, that the data volume associated with such comparison does not exceed reasonable limits for memory and temporary storage space, and that a unique value for each row of the outer relation table or query block exists, or can be generated, to be used in conjunction with the above data comparison. In the exemplary embodiment, any correlated references with the scalar operations are used in equality comparisons. Predetermined information from the analysis performed may be recorded for later use in process 500.

Process 500 in response to a determination that the input analyzed is not eligible to use the enhanced decorrelation; process 500 reverts to continue to use the conventional processing. In this context, conventional processing means row-at-a-time processing for an outer relation and reevaluation of the correlated scalar subquery. In response to a determination of eligibility for transformation, process 500 injects, using a query engine, additional processing into the parsed representation of the query to defer checking of a 1 row condition required by the query semantics, step 504. This additional processing into the representation of the query provides a capability of deferring the checking of the 1 row condition required by the query semantics.

Process 500 injects, using the query engine, processing to utilize the result of the additional processing of step 504 to validate that a single row is produced for the set of columns which corresponded to the columns used in the original correlated scalar subquery execution, step 506.

Process 500 modifies the parsed representation of the query to remove the 1 row condition required by query semantics, step 508. Process 500 decorrelates, using the query engine, the parsed representation of the query using a selected one of existing methods absent a requirement for a unique key to be present in a predicate of the scalar operation, step 510.

The injected processing builds an OUTER JOIN between an outer table and the subquery body, in which the join predicate is the original correlated predicates. A compensation expression including an SQLSTATE 21000 is also built to raise an error when the injected validation determines the result is not a singleton for the set of columns which correspond to the columns used in the original correlated scalar subquery execution. Results of processing can have three different options described as when the body of the scalar operation produces a result of 0, 1 or greater then 1 row. The original SQL statement has been replaced with a transformed SQL statement built for execution by the SQL execution engine.

There are a variety of possible ways for the described deferral process to occur depending on the supported operations within the data processing system DPS 300. In general, the deferral uses criteria comprising either an aggregation or a numbering of result tuples according to a particular key. As described above, the query engine injects a window function in conjunction with the window-name-or-specification at a location after the created OUTER JOIN operation, which replaced the scalar operation. The query engine further adds all referenced columns from any tables or relations present in a parent operation to the window-specification of the window-function. The query engine further adds the column or columns representing the unique identifier or generates a unique identifier for each row of the parent operation to the window-specification of the window-function. The query engine further utilizes a COUNT column-function as the window function described above and referencing the correlated column. In an alternate embodiment, a numbering-function such as ROW_NUMBER may be used instead of the COUNT column-function described above for the window-function. In a further alternate embodiment, a GROUP BY operation with a grouping key similar to the window-specification described above may replace the window-function.

The query engine injected processing to validate that a single row is produced for each set of columns referenced in the window-specification. Should more than 1 row be produced, the additional processing raises an error appropriate to the particular query language used.

In the exemplary embodiment, a new query block consuming the result of the window function is added with an expression in a form CASE WHEN window_func_result>1 THEN RAISE_ERROR(SQLSTATE 21000) END where window_func_result is a result of the added window-function.

The representation of the query is modified to remove the semantic condition that exactly 1 row must be produced by the scalar operation. In the exemplary embodiment, this also involves updating predetermined annotations in an internal representation.

The query engine decorrelates the query using existing methods without requiring a unique key to be present in the predicate of the scalar operation. In the exemplary embodiment, the decorrelation comprises converting the scalar operation to an OUTER JOIN invoked prior to the window function that was injected. The original parent operation becomes a tuple preserving operand and the body of the original scalar operation becomes a NULL producing operand of the OUTER JOIN. In this case the order of the tuple preserving operand is not specified so the term may be correctly referred to as simply OUTER JOIN. The exemplary embodiment described thus performs the decorrelation of the original query while maintaining the required semantics as specified in the original query.

Figure 6:
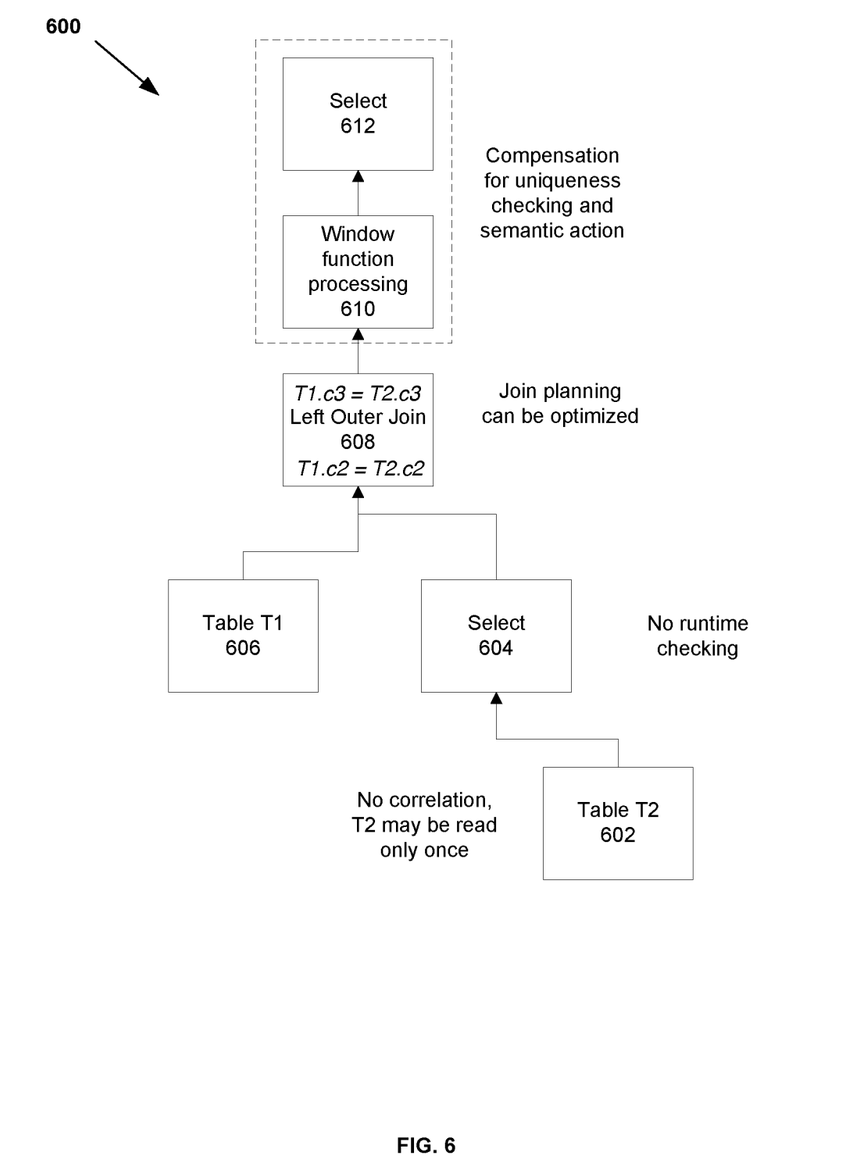
FIG. 6 is a flowchart of a process using the database management system of FIG. 3 in accordance with one embodiment of the disclosure.

FIG. 6 is a flowchart of a processing using method 500 of FIG. 5. In the example using process 600, a statement of Select t1.c1 from t1 where t1.c3=(select t2.c3 from t2 where t1.c2=t2.c2) is used.

Using process 600, table T1 606 still has N rows, but table T2 602 requires no correlation and may be read only once. However, in contradistinction with conventional processing, a LEFT OUTER JOIN is built in which t1.c2=t2.c2 and t1.c3=t2.c3 in left outer join 608. In this example, the order of the tuple preserving operand is indicated as the original parent being the first operand of the expression and a corresponding statement would be written as 'original parent' LEFT OUTER JOIN 'scalar operation.' As previously stated with regard to process 500 of FIG. 5, in this context, conventional processing also means row-at-a-time processing for an outer relation and reevaluation of the correlated scalar subquery. This enables join planning to be optimized and used. A window function is performed in window function processing 610.

In contrast with process 600 of the example, conventional processing using table T1 606 having N rows and correlated access of table T2 602 would perform runtime checking at select 604 for a result of 0 or 1 rows per outer value. Furthermore, the conventional processing would require reading the correlation table T2 602 approximately N number of times, once per row of table T1 606.

The result is an improvement in performance over the conventional process at least through a reduction in a number of reads required using table T2 602 in the conventional process.

Thus, embodiments of the disclosure entail transformation of a scalar subquery into an OUTER JOIN operation and associated post-processing to delay the singleton semantic checking to a later point in the runtime processing. Any correlated predicates are rewritten as the join predicates of the OUTER JOIN to preserve the semantic requirement that NULL values are generated for scalar subqueries which produce 0 rows. The associated post processing could include, but is not limited to, addition of windowing functions or GROUP BY operations to ensure singleton output and preserve semantic correctness of the query.

Embodiments of the disclosure extend existing art in the field of subquery decorrelation to include cases where using the schema it cannot be proven a priori that the subquery returns at most 1 result tuple. In embodiments of the disclosure, the query is rewritten to take advantage of the decorrelation and also to inject another operation that will check the single result requirement at runtime, for example, a windowed count or numbering function, or a counted GROUP BY operation. When the single result requirement is not met, then an error is raised. In this context, the original scalar subquery would have raised the same error when the single result requirement was not met even when a more naive implementation was used.

Embodiments of the disclosure exploit the deferral of runtime checking of a scalar subquery to after computation of a join. The deferral guarantees that the generated outer join will be free of correlation and therefore can make use of any join enumeration technique available to the optimizer. The transformation is also applicable to query types other than SELECT including UPDATE, INSERT, DELETE, and MERGE operations, which constitutes a very large part of enterprise level analytical workload.

Thus, embodiments of the disclosure provide a capability that is typically better than previously explored solutions because the embodiments do not incur the overhead of extra joins or query processing as well as do not require singleton constraints to be imposed on the query during compilation.

Example 7 is a code statement representation of a transformation using a SELECT operation with process 500 of FIG. 5. In this example, a query statement of Select t1.c1 from t1 where t1.c3=(select t2.c3 from t2 where t1.c2=t2.c2) is used as input to the method. The following example shows three variations, with reference to the statement of Example 7, the portions in italics represent those of the transformed operation.

```
select t1_c1
    from (
        select case when cnt_t2_c2 > 1
                        then RAISE ERROR('SQLSTATE 21000') end,
                t1_c1
        from (
            select t1.c1 as t1_c1, t1.c3 as t1_c3,
                    count(t2.c2) as cnt_t2_c2, max(t2.c3) as t2_c3
            from t1 LEFT OUTER JOIN t2 on t1.c2 = t2.c2
            group by t1.c1, t1.TID
            )
        )
    where t2_c3 = t1_c3
or
select t1_c1
    from (
        select case when row_number( ) over (partition by t1.c1, t1.TID) > 1
                        then RAISE ERROR('SQLSTATE 21000') end,
                t1.c1 as t1_c1, t1.c3 as t1_c3, t2.c3 as t2_c3
        from t1 LEFT OUTER JOIN t2 on t1.c2 = t2.c2
            )
    where t1_c3 = t2_c3
or
select t1_c1
    from (
        select case when count (t2.c2) over (partition by t1.c1, t1.TID) > 1
                        then RAISE ERROR('SQLSTATE 21000') end,
                t1.c1 as t1_c1, t1.c3 as t1_c3, t2.c3 as t2_c3
        from t1 LEFT OUTER JOIN t2 on t1.c2 = t2.c2
            )
    where t1_c3 = t2_c3
```

In Example 7, t1.TID is a tuple-identifier used to identify all data tuples within table T1. There is however, no singleton requirement placed on table T2 in contrast with the previous conventional processing.

Example 8 is a code statement representation of a transformation using an UPDATE operation using process 500 of FIG. 5. In Example 8, data modifying statement of Update t1 set c1=(select t2.c1 from t2)☐ where exists (select * from t2 where t1.c2=t2.c2) is used as input to process 500. The data modifying statement, when re-written, includes a transformed operation (indicated in italics).

```
update t1 SET t1.c1 = t2_c1
    from (select case when row_number( ) over (partition by t1.c1, t1.TID) > 1
            then RAISE ERROR('SQLSTATE 21000') end,
        t1.c1 as t1_c1, t1.c3 as t1_c3, t2.c3 as t2_c3
        from t1 LEFT OUTER JOIN t2 on t1.c2 = t2.c2
        )
    where exists (select * from t2 where t1.c2 = t2.c2)
```

Note that as a result of the transformed operation, this non-scalar subquery may then be decorrelated using a selected one of a number of predetermined existing decorrelation methods.

Embodiments of the disclosure provide increased capability when combined with other techniques and existing decorrelation methods. Additionally, when an embodiment is used in a partitioned system, the embodiment identifies the most likely zones to have a serialized per-row processing of results, and transform it so that it becomes executable in parallel. Additionally, the decorrelation method of an embodiment can be extended to all query types including but not limited to SELECT, INSERT, UPDATE, DELETE and MERGE operations.

Embodiments of the disclosure are suitable for use in a large number of modern applications, for example Big Data applications, where uniqueness constraints cannot be guaranteed. Furthermore, embodiments of the disclosure are applicable to all query types including SELECT, INSERT, UPDATE, DELETE, and MERGE, as well as XML processing, which constitutes a very large part of any enterprise level analytical workload. The embodiments of the disclosure do not incur the typical overhead of extra joins and do not require singleton constraints to be defined. The optimizer and runtime can therefore choose from a wider variety of different optimizations to obtain faster query processing than previously afforded using conventional processing. Moreover, because decorrelation is typically a processing issue for all major relational database management systems, in particular when using a cloud domain where SQL queries are software generated and can rarely be modified by hand, the embodiments of the disclosure provide processing improvements.

An embodiment of the present disclosure provides a capability of extending the decorrelation technique of scalar subquery to join by relaxing the semantic requirement of a provable singleton output. This embodiment described enables decorrelation of a much larger set of queries and provides powerful capabilities to a query compiler by enabling a broader scope of hash joins, join enumeration and other query rewrite optimizations than typically available using existing solutions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Thus, is presented in an illustrative embodiment a computer-implemented process for transforming a scalar subquery to join with non-provable singleton output. The computer-implemented process, in response to receiving a parsed representation of a query statement or data modifying statement containing a scalar operation, which is correlated to predetermined types of objects, analyzes the parsed representation to determine eligibility for transformation on any scalar operations present in the parsed representation. In response to a determination of eligibility for transformation, a query engine is directed to inject additional processing into the parsed representation of the query to defer checking of a 1 row condition required by query semantics. In addition, the query engine is directed to inject processing to utilize a result of the additional processing to validate that a single row is produced for a set of columns corresponding to respective columns used in an original correlated scalar subquery execution. The parsed representation of the query is modified to remove the 1 row condition required by query semantics. The query engine is further directed to decorrelate the parsed representation of the query using a selected existing method absent a requirement for a unique key to be present in a predicate of the scalar operation.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer system for transforming a scalar sub-query to join with non-provable singleton output, the computer system comprising:
   a system bus;
   a communications unit connected to the system bus;
   a memory comprising memory elements connected to the system bus, storing computer executable instructions comprising program code thereon;
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   analyzing, in response to receiving a parsed representation of a statement containing a scalar operation, which is correlated to predetermined types of objects, the parsed representation to determine eligibility for transformation on any scalar operations present in the parsed representation;
   injecting, using a query engine, in response to a determination of eligibility for the transformation, additional processing into the parsed representation of the statement to defer checking of a one row condition required by statement semantics;
   injecting, using the query engine, further processing to utilize a result of the additional processing to validate that a single row is produced for a set of columns corresponding to respective columns used in an original correlated scalar subquery execution;
   modifying the parsed representation of the statement to remove the one row condition required by the statement semantics; and
   decorrelating, using the query engine, the parsed representation of the statement using a selected predetermined method absent a requirement for a unique key to be present in a predicate of the scalar operation.

2. The computer system of claim 1, wherein a determination of eligibility includes processing one or more conditions comprising column lengths, data types, uniqueness, presence of indexes, non-determinism, operations with side effects, additional semantic requirements conflicting with a transformation, additional semantic requirements compatible with the transformation, an ability to sort data, an ability to compare data, a sampling of data, involvement in a recursion, and a process in which a correlated reference is used in a scalar operation.

3. The computer system of claim 1, wherein a determination of eligibility includes conditions comprising a requirement that all columns coming from an outer relation are of a type and a length that can be sorted and compared, that a data volume associated with such comparison will not exceed predetermined limits for memory and temporary storage space, and that a unique value for each row of the outer relation exists to be used in conjunction with a predetermined data comparison and any correlated references with the scalar operation are used in equality comparisons.

4. The computer system of claim 1, wherein the one or more processors executes the computer executable instructions to defer checking further, further comprises:
   selecting a particular deferral from a plurality of deferrals depending on supported operations, within a data processing system, including aggregation and a numbering of result tuples according to a particular key.

5. The computer system of claim 1, wherein the one or more processors executes the computer executable instructions to inject the additional processing, further comprises:
   inject, using the query engine, a window function in conjunction with a window-name-or-specification at a location after a created OUTER JOIN operation, which replaced the scalar operation;
   add all referenced columns from any tables and relations present in a parent operation to the window-name-or-specification of the window-function;
   add one or more columns representing a unique identifier from any tables and relations present in a parent operation to the window-name-or-specification of the window-function, wherein the unique identifier is generated for each row of the parent operation;

use a COUNT column function as the window function and referencing a correlated column; and add a new query block consuming a result of the window function using an expression in a form CASE WHEN window_func_result>1 THEN RAISE_ERROR(SQL-STATE 21000) END, wherein the window_func_result is a result of the window-function.

6. The computer system of claim 5, wherein in a first alternative embodiment, a numbering-function including ROW_NUMBER is used instead of the COUNT column function for the window-function.

7. The computer system of claim 5, wherein the one or more processors executes the computer executable instructions to decorrelate, further comprises:

converting the scalar operation to an OUTER JOIN invoked prior to the window function that was injected, wherein an original parent operation becomes a tuple preserving operand and a body of an original scalar operation becomes a NULL producing operand of the OUTER JOIN, and wherein required semantics as specified in an original statement are maintained.

8. The computer system of claim 1, the one or more processors executes the computer executable instructions, further comprises:

identifying, in a partitioned system, zones most likely to have a serialized per-row processing of results; and transforming statements, in identified zones, to be executed in parallel.

9. A computer program product for transforming a scalar sub-query to join with non-provable singleton output, the computer program product comprising:

one or more computer-readable storage media and program instructions stored on at least one of the one or more tangible storage media, the program instructions executable by a processor to cause the processor to perform a method comprising:

analyzing, in response to receiving a parsed representation of a statement containing a scalar operation, which is correlated to predetermined types of objects, the parsed representation to determine eligibility for transformation on any scalar operations present in the parsed representation;

injecting, using a query engine, in response to a determination of eligibility for the transformation, additional processing into the parsed representation of the statement to defer checking of a 1 row condition required by statement semantics;

injecting, using the query engine, further processing to utilize a result of the additional processing to validate that a single row is produced for a set of columns corresponding to respective columns used in an original correlated scalar subquery execution;

modifying the parsed representation of the statement to remove the 1 row condition required by the statement semantics; and decorrelating, using the query engine, the parsed representation of the statement using a selected predetermined method absent a requirement for a unique key to be present in a predicate of the scalar operation.

10. The computer program product of claim 9, wherein the program instructions executable by a computer to cause the computer to defer checking, further comprises:

selecting a particular deferral from a plurality of deferrals depending on supported operations, within a data processing system, including aggregation and a numbering of result tuples according to a particular key.

11. The computer program product of claim 9, wherein the program instructions executable by a computer to cause the computer to inject the additional processing, further comprises:

inject, using the query engine, a window function in conjunction with the window-name-or-specification at a location after a created OUTER JOIN operation, which replaced the scalar operation;

add all referenced columns from any tables and relations present in a parent operation to the window-name-or-specification of the window-function;

add one or more columns representing a unique identifier from any tables and relations present in a parent operation to the window-name-or-specification of the window-function, wherein the unique identifier is generated for each row of the parent operation;

use a COUNT column function as the window function and referencing a correlated column; and add a new query block consuming a result of the window function using an expression in a form CASE WHEN window_func_result>1 THEN RAISE_ERROR(SQL-STATE 21000) END, wherein window_func_result is a result of the window-function.

12. The computer program product of claim 9, wherein the program instructions executable by a computer to cause the computer to decorrelate, further comprises:

convert the scalar operation to an OUTER JOIN invoked prior to the window function that was injected, wherein an original parent operation becomes a tuple preserving operand and a body of an original scalar operation becomes a NULL producing operand of the OUTER JOIN, and wherein required semantics as specified in an original statement are maintained.

* * * * *